United States Patent [19]
Cohen et al.

[11] Patent Number: 5,862,269
[45] Date of Patent: Jan. 19, 1999

[54] APPARATUS AND METHOD FOR RAPIDLY CONVERGENT PARALLEL PROCESSED DECONVOLUTION

[75] Inventors: Nathan Cohen, Belmont, Mass.; Edwin van de Wetering, Borne, Netherlands

[73] Assignee: Trustees of Boston University, Boston, Mass.

[21] Appl. No.: 624,057

[22] Filed: Mar. 29, 1996

Related U.S. Application Data

[63] Continuation of Ser. No. 346,253, Nov. 23, 1994, abandoned.

[51] Int. Cl.$^6$ .............................. G06K 9/54; G06K 9/40
[52] U.S. Cl. .......................... 382/304; 382/275; 382/279
[58] Field of Search ................................... 364/819, 820, 364/728.01, 728.03; 382/276, 278, 279, 273, 274, 275, 265, 302–304; 345/137

[56] References Cited

U.S. PATENT DOCUMENTS

| | | | |
|---|---|---|---|
| 3,627,920 | 12/1971 | Schroeder et al. | 382/54 |
| 4,876,509 | 10/1989 | Perlmutter | 324/309 |
| 4,973,111 | 11/1990 | Haacke et al. | 324/309 |
| 4,998,288 | 3/1991 | Bui et al. | 382/54 |
| 5,047,968 | 9/1991 | Carrignton et al. | 364/574 |
| 5,111,823 | 5/1992 | Cohen | 128/660.07 |
| 5,128,525 | 7/1992 | Stearns et al. | 235/454 |
| 5,168,147 | 12/1992 | Bloomberg | 235/456 |
| 5,229,934 | 7/1993 | Mattson et al. | 364/413.21 |
| 5,247,588 | 9/1993 | Komatsu | 382/54 |
| 5,268,771 | 12/1993 | Murakami et al. | 382/233 |
| 5,315,532 | 5/1994 | Comon | 364/553 |
| 5,383,457 | 1/1995 | Cohen | 128/660.07 |

OTHER PUBLICATIONS

Burch, S., Gull, S., and Skilling, J., "Image Restoration by a Powerful Maximum Entropy Method", *Computer Vision, Graphics, and Image Processing*, vol. 23, pp. 123–128, (1983).

Chen, C., and Frater, R., "A High–Speed Hardware Clean Processor and Its use in an Interactive Process", *Indirect Imaging*, J. Roberts editor, Cambridge University Press, Cambridge, 1984, pp. 425–430.

Christiansen W. N. & Hogborn J.A., *Radio telescopes*, 2nd. ed., pp. 214–216.

Cohen, N., "Practical Real–Time Deconvolution and Image Enhancement of Medical Ultrasound", *Biomedical Image Processing and 3–D Microscopy: Proc. SPIE 1660*, R. Achyra, C. Cogswell, and D. Goldgof, eds., SPIE, Bellingham, WA, 1992, pp. 72–82.

Cohen. N., and Sandri, G., "Comparative Study of Real–Time Deconvolution Methods in Medical Imaging", *Biomedical Image Processing and 3–D Microscopy: Proc. SPIE 1660, R. Achyra, C. Cogswell, and D. Goldgof, eds., SPIE, Bellingham, WA, 1992, pp. 88–94*.

Cohen N., and Sandri, G. "Data Compression Using the Deconvolution algorithm Clean",*IJIST*, in press, (1994).

(List continued on next page.)

*Primary Examiner*—Leo H. Boudreau
*Assistant Examiner*—Bhavesh Mehta
*Attorney, Agent, or Firm*—Samuels, Gauthier, Stevens & Reppert

[57] ABSTRACT

An image processing system and method which may be used for standalone deconvolution or, alternatively, may be employed as a staring point for very rapid convergence with subsequent use of prior art deconvolution methods. Processing speed is improved because the sequential requirement of the CLEAN method is relaxed. Fractional removal of noise is accomplished for multiple features within the image during the processing of a single subtractive iteration. Thus the number of iterations can be significantly reduced allowing dramatic reduction of the subtractive stage and a resulting increase in overall processing speed.

18 Claims, 6 Drawing Sheets

OTHER PUBLICATIONS

Hogborn, J., "Aperture Synthesis with a Non–regular Distribution of Interferometer Baselines", *Astronomy and Astrophysics Supplement Series*, vol. 15, pp. 417–426, (1974).

Jansson, P., "Deconvolution with Applications to Spectroscopy", Academic Press, Orlando, 1984, Chapter 7 Deconvolution Examples, pp. 187–225.

Schwartz, U., "The Reliability of Clean Maps and the Corrugation Effect", *Indirect Imaging*, op.cit., pp. 255–260.

Steinberg, B., and Subbaram., H., "Microwave Imaging Techniques", J. Wiley, New York, 1991, Chapter 7 Deconvolution, pp. 145–179.

Thompson, A., Moran., J., and Swenson, G., "Interferometry and Synthesis in Radio Astronomy", J. Wiley, New York, 1986, Chapter 11 Image Processing And Enhancement, pp. 342–368..

APPARATUS AND METHOD FOR RAPIDLY CONVERGENT PARALLEL PROCESSED DECONVOLUTION

This application is a continuation of application Ser. No. 08/346,253, filed Nov. 23, 1994 now abandoned.

SOURCE CODE APPENDIX

A source code appendix containing 18 pages of source code is attached as an appendix.

FIELD OF THE INVENTION

This invention relates generally to a device and technique for deconvolution of images and more specifically to parallel processed deconvolution allowing rapid convergence.

BACKGROUND OF THE INVENTION

Many scientific and engineering applications presently involve some sort of digital image processing. The digital images which are studied cover an incredibly broad range of applications including, by way of example, early fetus development using sonograms, astronomical images created through a myriad of light detecting instruments and medical applications such as MRI, PET and NMR devices. In addition, devices as simplistic and pervasive as facsimile machines involve digital images to which the teachings of this invention apply. The processing of these images requires the conversion of a continuous set of analog data into a corresponding digital form. Two-dimensional images are commonly rasterized by scanning images spots contained in the analog data set. Each pixel resulting from the scan is sampled so as to quantize the particular intensity associated with the pixel. These intensity values are combined with the physical coordinates of the pixels to create a representation of the overall image.

Unfortunately, there exist many sources of noise and distortion which degrade the image prior to the time that it is stored. Quantization errors, non-uniform illumination of the image, thermal noise and impulse noise all contribute to inaccuracies which are introduced into the representational image as blurred representations. In order to eliminate these distortions, techniques, falling under the broad category of "deconvolution" methods, have been developed. One such method for deconvolution method well known in the art is the CLEAN technique.

CLEAN was first described by Hogbom in "Aperture Synthesis with a Non-regular Distribution of Interferometer Baselines", *Astronomy and Astrophysics Supplement Series*, Vol 15, pp. 417–426 (1974). It remains among the most utilized of deconvolution methods in the field of astronomy. The utility of this method has been proven as a result of its ease of programming, accuracy and general applicability to a variety of applications. CLEAN is a nonlinear, arithmetic, sequentially iterative process for achieving deconvolution.

The CLEAN method is further beneficial because it is robust, affords superresolution and does not require precise knowledge of the point spread function (PSF) to achieve acceptable deconvolution. Furthermore, its simple arithmetic approach in the data domain obviates the need for processing involving the inverse domain. As a result, CLEAN has heretofore met the general requirements of most standard deconvolution applications. Additionally, there are a variety of cases in which nonlinear methods, such as CLEAN, present a distinct advantage over linear methods. If the PSF is sparsely sampled, if it drops to zero more than once (such as with a sinc-like function), or if it is asymmetric (as is the case when motion blur is present), linear methods will fail and CLEAN and/or other nonlinear methods may be the only alternative.

One compelling impediment against the use of CLEAN is its computational speed. Like all nonlinear deconvolution schemes, CLEAN is slower (often by an order of magnitude or more) than linear deconvolution. CLEAN has been reported, however, to be faster than many other nonlinear deconvolution methods. See "Comparative Study of Real-Time Deconvolution Methods in Medical Imaging", by N. Cohen and G. Sandri, *Biomedical Image Processing and 3-D Microscopy: Proc. SPIE* 1660, R. Achyra, C. Cogswell, and D. Goldgof, eds., SPIE, Beliingham, Wash., 1992, pp. 88–94.

Nevertheless, numerous attempts have been made to increase the speed of the CLEAN method. The first known attempt was by Chen and Frater in 1984. See "A High-Speed Hardware 'CLEAN' Processor and its use in an Interactive Process", *Indirect Imaging*, J. Roberts editor, Cambridge University Press, Cambridge, Mass., 1984, pp. 425–430. The speed of CLEAN was significantly improved through the use of a limited instruction set array processor running a radically modified version of CLEAN. The most notable modification in the design of Chen and Frater was the truncation of the PSF ("dirty beam") into a main lobe and sidelobes thereafter partitioning the image. The process was reported to work well, increasing the processing speeds to fractions of a second. Unfortunately, this method, because of such a partitioning scheme precluded applications when the PSF is not sinc-like.

Cohen, in 1992, reported the first real-time CLEAN processor. See "Practical Real-Time Deconvolution and Image Enhancement of Medical Ultrasound", *Biomedical Image Processing and 3-D Microscopy: Proc. SPIE* 1660, R. Achyra, C. Cogswell, and D. Goldgof, eds., SPIE, Beliingham, Wash., 1992, pp. 72–82. At a 15 Hz rate, 400×300 pixel ultrasonic images were deconvolved successfully. Despite these efforts, it has not heretofore been demonstrated that CLEAN or any other deconvolution method, has a general application for more modest computational platforms wherein rapid or real time processing requirements are imposed.

CLEAN is an arithmetic, sequentially iterative process in which each iteration involves the fractional subtraction of the PSF (via loop gain $\gamma$) from the data domain at the position of the peak feature within the image or dataset. Each iteration generates as an outcome a component representing the delta function between the PSF and the data domain resulting in an array of CLEAN components. The residual data domain then comprises the data set for the next iteration. When the intensity of the residual data domain falls below a threshold level (T), the subtractive phase terminates. At this point, the above-described array of CLEAN components is available for the next phase of the CLEAN method, the reconstructive phase.

In the reconstructive phase, the array of CLEAN components is multiplied by a second PSF (the "CLEAN beam") to recover the deblurred image. As will be described in detail below, the CLEAN beam is constructed based upon the particular characteristics of the imaging apparatus. Threshold residuals may further be added to the reconstructed image if desired. This would allow random noise to be introduced in the event precision measurements are desired.

One of the drawbacks of the CLEAN method is that during the subtractive stage, considerable time is spent during a large number of iterations searching for data peaks. Thus, CLEAN's search time is large with respect to the time for arithmetic operations, especially for large n-dimensional arrays. The subtractive stage of CLEAN dominates the processing time for deconvolution of the image.

The sequential nature of CLEAN has been believed to be responsible for it success to date. Many investigators of skill in the art have thus believed that any modifications to the CLEAN method which undermine its sequential nature risk degradation of image accuracy.

SUMMARY OF THE INVENTION

It is thus an object of this invention to provide a method and apparatus for deconvolving images across a broad variety of applications.

It is a further object of this invention to provide a method and apparatus which performs image processing at significantly improved processing speeds.

It is a still further object of this invention to provide a method and apparatus for deblurring an image at high processing speeds in a parallel processing enviroment.

It is a yet further object of this invention to provide a method and apparatus which can perform deconvolution in real-time applications on standard hardware platforms.

These and other objects of this invention are accomplished through the use of a parallel processed method for deconvolution derived from the CLEAN technique. This technique, dubbed FASTCLEAN, may be used as a standalone deconvolution technique or it may be employed as a starting point for very rapid convergence with subsequent use of prior art deconvolution methods. Processing speed is improved because the sequential requirement of the CLEAN method is relaxed. Fractional removal of blur is accomplished for multiple features within the image during the processing of a single subtractive iteration. Thus the number of iterations can be significantly reduced allowing dramatic reduction of the subtractive stage and a resulting increase in overall processing speed.

The foregoing and other objects, features, and advantages of the invention will be apparent from the following more particular description of the preferred embodiments of the invention, as illustrated in the accompanying drawings.

BRIEF DESCRIPTION OF THE DRAWINGS

FIG. 5($b$) is the line drawing of FIG. 5($a$) blurred by a Gaussian PSF.

FIG. 5($c$) is the deblurred line drawing using the CLEAN technique.

FIG. 5($d$) is the deblurred line drawing using the system and method of this invention.

DESCRIPTION OF THE INVENTION

The method of this invention, dubbed FASTCLEAN, provides fast and accurate deconvolution of digital images. FASTCLEAN relaxes the sequential requirement of CLEAN. Rather than letting each iteration in the subtractive phase provide for the fractional subtraction of only one feature, FASTCLEAN acts by providing fractional removal for all features within an intensity range, $\beta$, of the peak for that iteration. The subtracted dirty beam (PSF) used in CLEAN is replaced by a composite surface (or spectrum, as appropriate) which is the superposition of the dirty beam placed at the position of the various peaks within the range. Several features are thus "CLEANED" during a given iteration. As a result, the number of iterations required during the subtractive phase is substantially reduced. Termination of the iteration process (subtractive phase) occurs when the overall intensity of the image is below a predetermined threshold, T.

Figure 1:
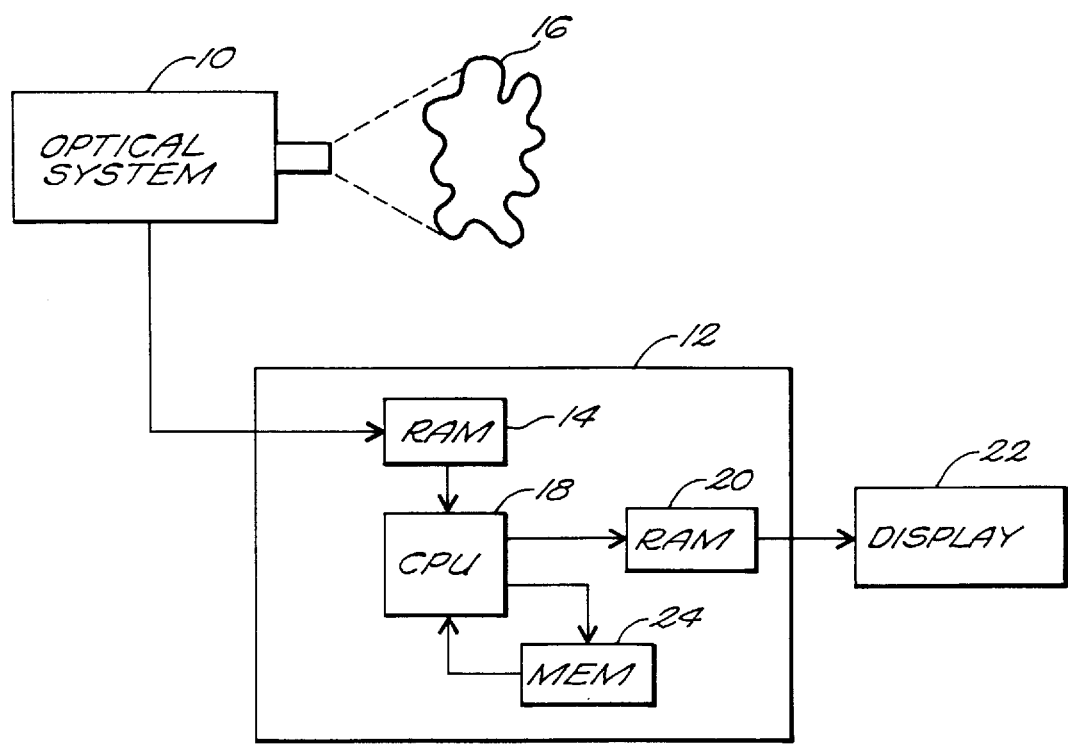
FIG. 1 is a block diagram of an apparatus for imaging an object according to a preferred embodiment of this invention.

FIG. 1. illustrates one possible embodiment of a system incorporating the invention herein. Such as system provides a viewing or imaging device as known in the art for viewing and/or imaging an object to be studied. In one particular embodiment of this invention, the viewing/imaging device may be an optical system 10 such as a microscope, telescope, camera or generalized system of lenses. Other possibilities for practicing this invention exist, however, including, for example, ultrasound, PET, NMR and other imaging devices. In this embodiment, an object 16 under examination is placed such that it may be viewed by optical system 10.

The viewed image is transmitted, as is known in the art, after conversion to digital form, to data processor 12 and specifically to a first memory 14 within data processor 12. The image thus stored in memory 14 may be referred to as a "dirty" image in that such image incorporates various inaccuracies, as discussed above, with respect to the true image of 16. A clean PSF, which is required to deconvolve the image, is generated as is known in the art and may also be stored in first memory 14. Alternatively, the clean PSF may be stored in second memory 20 or any other suitable memory structure within or interfacing with the system of this invention. As is known in the art, it is possible to store a series of images within first memory 14, for example from different viewing perspectives, of object 16. Data processor 12 includes processor 18 which is capable of processing data contained in first memory 14 and storing the results in second memory 20. As is known in the art, processor 12 may be specifically designed to process data according to the invention herein, or alternatively, processor 12 may be programmed with instructions contained within third memory 24. It should be noted in the above discussion that each of the memories 14, 20 and 24 may, in fact, be the same memory or be combined according to various combinations.

In a preferred embodiment, once the "dirty" image(s) is/are stored within memory 14, processor 18 may process data according to this invention storing the results (a "clean" image) in memory 20. Memory 20, which may be contained within data processor 12, is connected, either directly or indirectly, with display 22. Thus, the processed image may be viewed by a user at display 22. Display 22, may, by way of example, be a CRT device.

The particular method by which images may be rapidly deconvolved according to this invention is now described. It is to be understood that the below described method is preferably practiced in the above described system, but may be practiced on many other suitable systems and in many other environments as may be known in the art.

Representing the data set which is deconvolved as a one variable function, for simplicity, the data from an iteration of CLEAN may be represented as:

$$I(x)_{n+1} = I(x)_n - \gamma P(x)\delta(x-x_p); \tag{1}$$

where n represents the iteration number, x is position, and $x_p$ is the position of the peak feature for iteration n. (See *Cohen and Sandri*, 1994) In effect, the δ function positions the center of the PSF (P(x)) for the subtraction. Here, only one feature and the region around it is subtracted. The loop gain is represented by γ. Typical values for γ are 0.1 to 0.5. As is understood by one of ordinary skill in the art, the CLEAN method is not limited to one-variable functions and the description above is merely exemplary.

According to one aspect of the present invention, FAST-CLEAN includes an iteration technique in the subtractive phase incorporating several subtractions, each a fraction of the subtracted feature. Equation (1) may be expanded as follows:

$$= I(X)_n - \left[ \frac{I_{max}}{I_{max}} \cdot \gamma \cdot P(X_{max})\delta(X - X_{max}) + \frac{I_{max-\epsilon}}{I_{max}} \cdot \gamma \cdot \right.$$

$$P(X_{max-\epsilon})\delta(X - X_{max-\epsilon})\delta(X - X_{max-\epsilon}) + \ldots + \frac{I_{\beta max}}{I_{max}} \cdot \gamma \cdot$$

$$\left. P(X_{\beta max})\delta(X - X_{\beta max}) \right]$$

This expansion, in turn, yields the following:

$$I(X)_{n+1} = I(X)_n - \sum_{o}^{k} (I_m/I_{max})\gamma P(X)\delta(x - x_m) \tag{2}$$

where the summation over m represents the number of features, k, in data set $I(x)_n$ with intensities between the peak feature, $I_{max}$ and intensity $I_{max}(1-\beta)$ where β is the intensity range. A value of β=0.1, for example, will produce a fractional subtraction on k features for iteration n, whose intensities $I_m$ lie between 0.9 and 1.0 times the peak feature.

One of skill in the art will understand that with a β of 1.0, the method of this invention will fail since, in this case, there is no ability to distinguish between the possibility of a feature actually being a sidelobe of another, or being separate. Degradation from the equivalent of a best least-squares fit should apply with any value of β greater than the dynamic range resolution of the data set. Experimental data has indicated that there is a modest tradeoff of γ and β for optimal accuracy and computational speed. Typical values of β lie between 0.05 and 0.25.

The method of this invention invokes parallel-processing by accomplishing multiple subtractions simultaneously. This is achieved without partitioning data sets or imposing special restrictions on the PSF. Instead, flexibility in image deconvolution is provided at high processing speeds according to the method of this invention.

Figure 2:
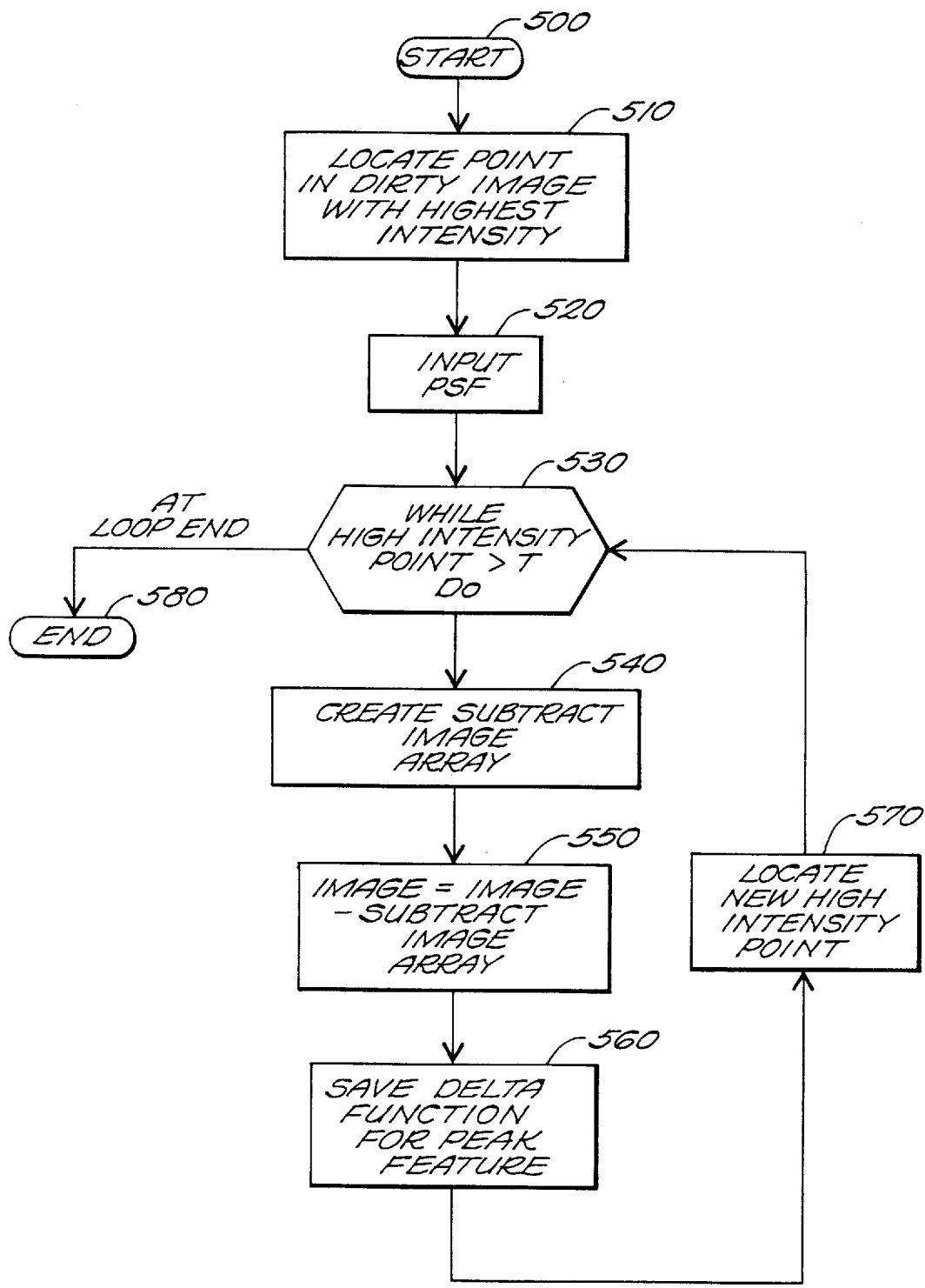
FIG. 2 is a flow diagram illustrating the subtractive phase of deconvolution according to a preferred embodiment of this invention.
Figure 3A:
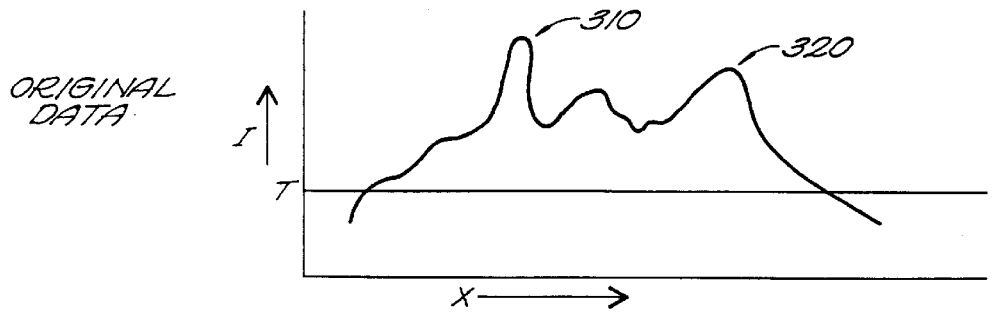
FIG. 3 is a series of image profiles illustrating the iterative process of FASTCLEAN in the subtractive phase.
Figure 3B:
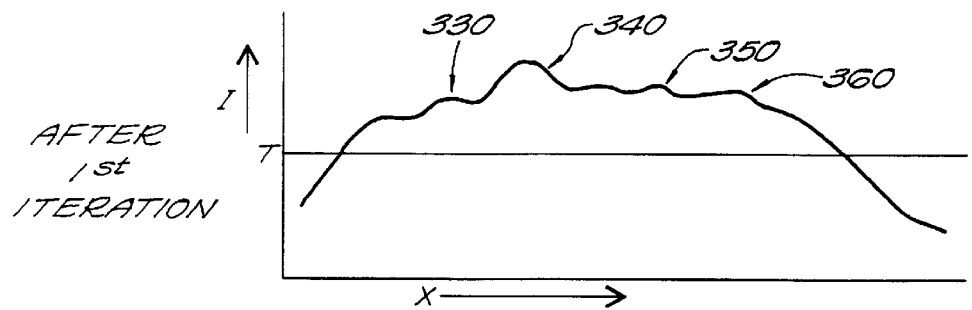
Figure 3C:
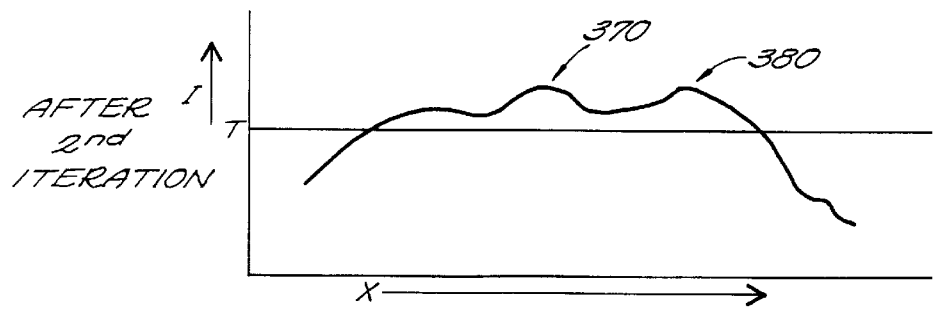
Figure 3D:
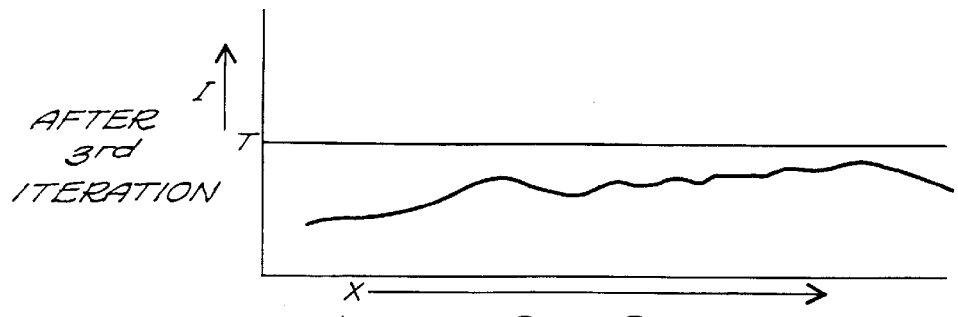

Referring now to FIGS. 2 and 3, the method for subtracting the dirty beam during the iterative phase will be described. Initially, at step 510, the position of the point in the dirty-image with the highest intensity is located. This is accomplished by scanning the image in a horizontal (row-by-row) or vertical (column-by-column) fashion and storing the highest intensity found along with the position of the pixel having that intensity. Next, at step 520, the middle point of the PSF is specified for use in the subtractive phase. It is possible, in one embodiment of this invention, to sequence through a series of PSF's in order to determine which such PSP is most appropriate for deblurring the subject image. This selection process is known as "blind deconvolution" and is described in "Blind Deconvolution of 3-D Flourescent Micrographs", by Krishnamurthi, Y., Liu, Y., Holmes, T., and Royser, B., *Biomedical Image Processing and 3-D Microscopy: Proc. SPIE* 1660, Achyra, R., Cogswell, C., and Goldgof, D., SPIE, Bellingham, Wash., 1992, pp. 95–102.

Next, at step 530, a loop is initiated that continues so long as the highest intensity value of the pixels in the image resulting from the subtraction is greater than the predetermined threshold, T. The first step in the loop, step 540, consists of creating the subtract image array. Thus, for every peak feature in the image, a subtract value is generated based upon Equation 2, above. The resulting subtract image array is referred to as the dirty beam PSF. At step 550, the subtract image array is subtracted from the original convolved image. In one embodiment of this invention, such array subtraction may occur sequentially for each feature in the image. Alternatively, array processing functions may be used to perform all or a plurality of the subtractions in parallel fashion. In order to accomplish the latter implementation, CPU 18 must be capable of such parallel processing. The amount of subtraction for this peak feature is next saved in the delta function array at step 560. At step 570, the new highest intensity for the image is obtained in the same manner as discussed above. At this point the loop, beginning at step 530, is reinitiated. If the new high intensity point is less than or equal to the threshold value, T, the loop terminates at step 580 and the subtractive phase is completed. If the new high intensity point is greater than T, the steps in the loop are repeated beginning at step 530 and additional subtractions are performed.

FIG. 3 diagrammatically illustrates the resultant images as FASTCLEAN proceeds through the subtractive phase. Each of the intensity versus position profiles in FIG. 3 represents the resulting image after completion of a particular iteration during the subtractive phase. For example, the original image may be represented by the first dirty beam having two peaks at 310 and 320. During the first iteration of the subtractive phase, these two peaks will be selected for subtraction. As discussed above, any peaks falling within intensity range β such that any feature lying between the highest intensity peak feature $I_{max}$ and intensity $I_{max} * (1-\beta)$ will be selected for subtraction. This iteration will allow for removal of these two peaks during a single iteration, rather than requiring two separate iterations and additional time consuming searches for peak features as in the prior art. Following the first iteration, the resulting image is represented by the second profile. In particular, the two peaks selected for subtraction have been removed.

So long as there is a peak remaining that is above the threshold value, T, the subtractive phase will continue into the next iteration. In this example, after the first iteration is complete, four peaks (330, 340, 350 and 360) are selected for subtraction during the second iteration. After the completion of the second iteration, only two peaks remain above the threshold level, T, and it is these two that are selected for subtraction during the third iteration. Upon completion of the third iteration, the image looks as shown in the fourth profile in FIG. 3, wherein no peak rises above threshold level T. At this point the subtractive phase is completed.

Figure 4:
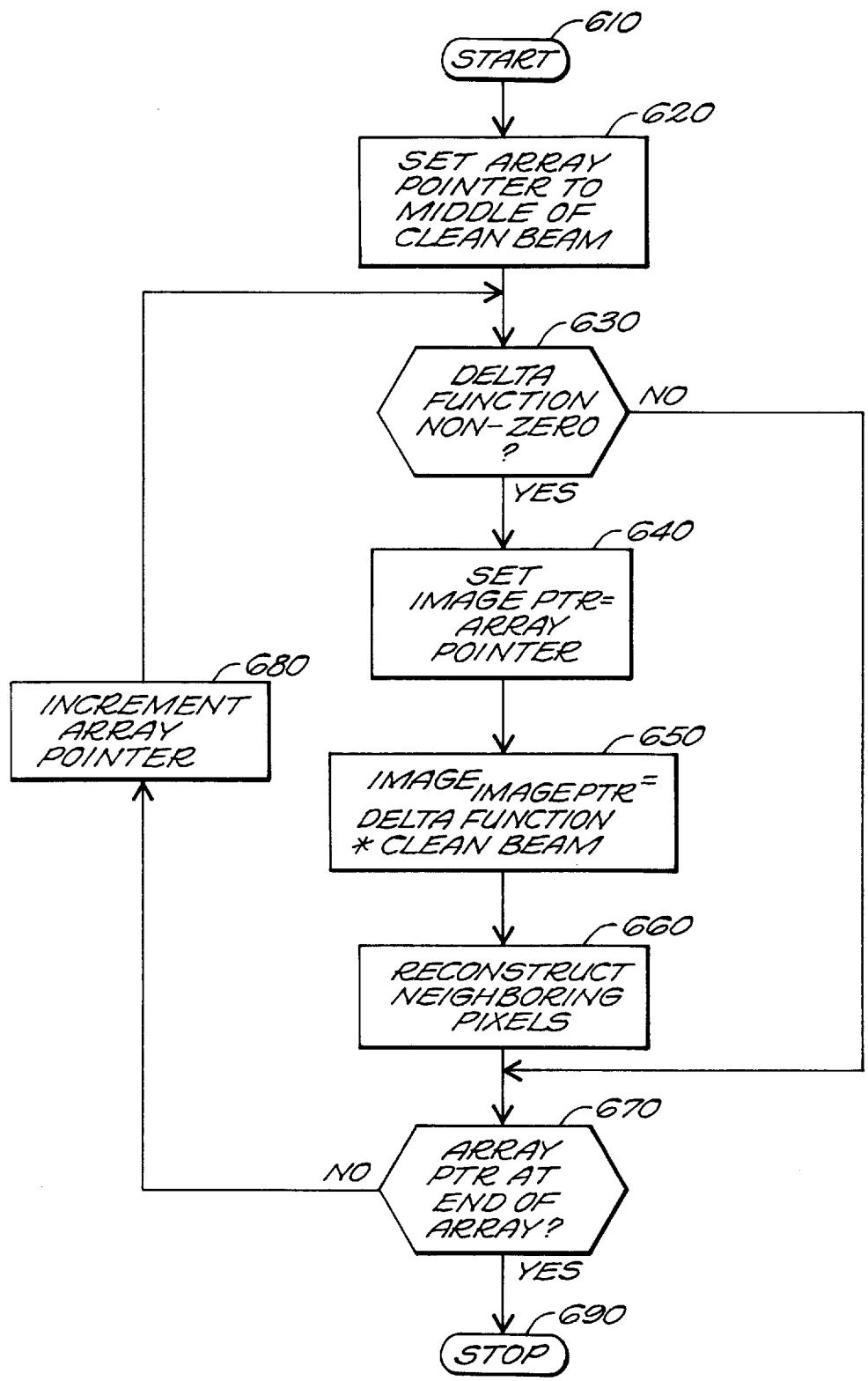
FIG. 4 is a flow diagram illustrating the reconstructive phase of deconvolution according to a preferred embodiment of this invention.
Figure 5A:
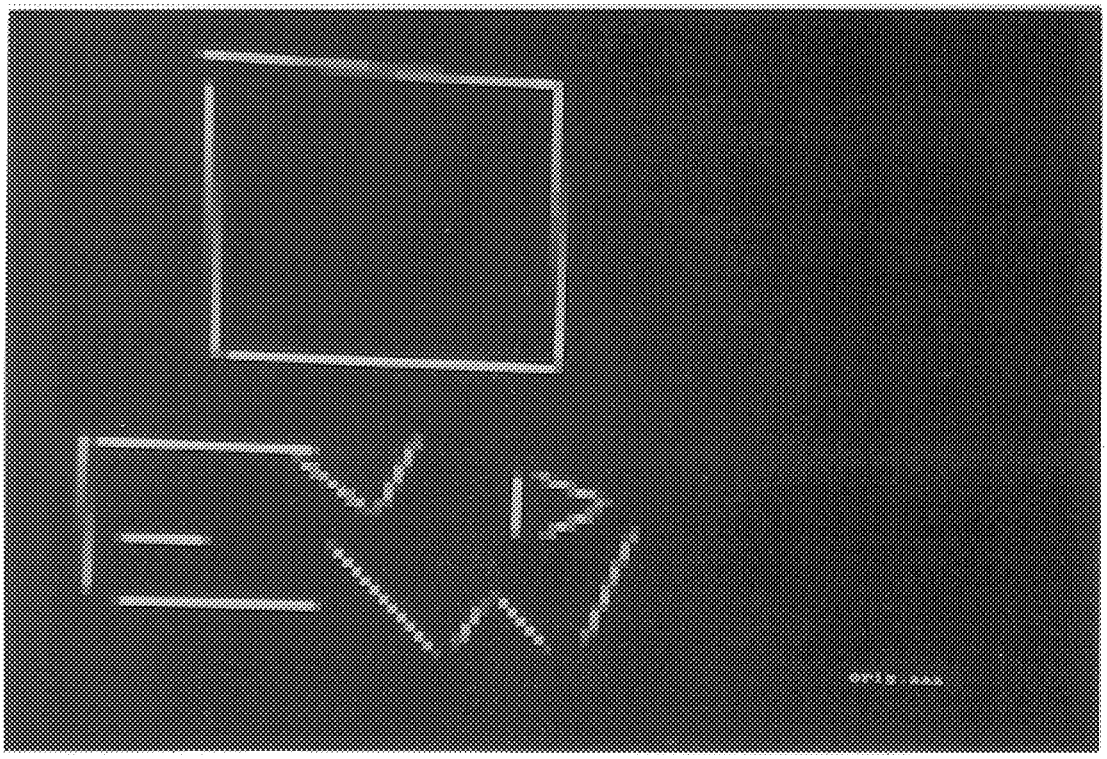
FIG. 5($a$) is an original 100×100 line drawing.
Figure 5B:
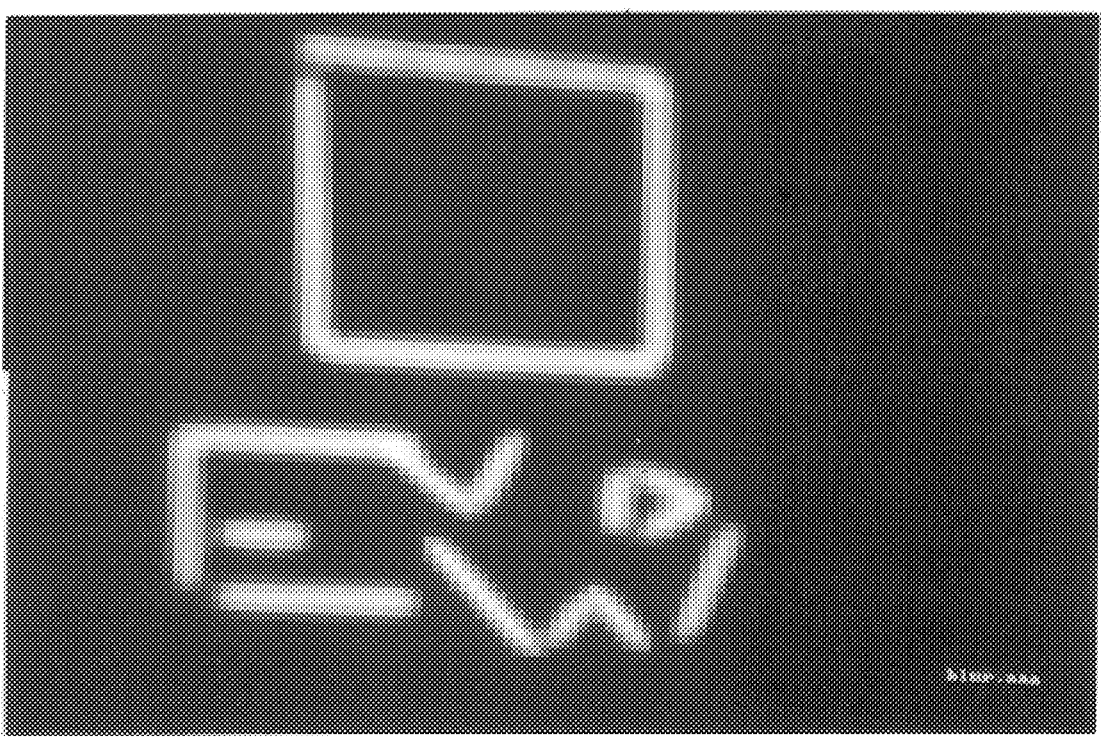
Figure 5C:
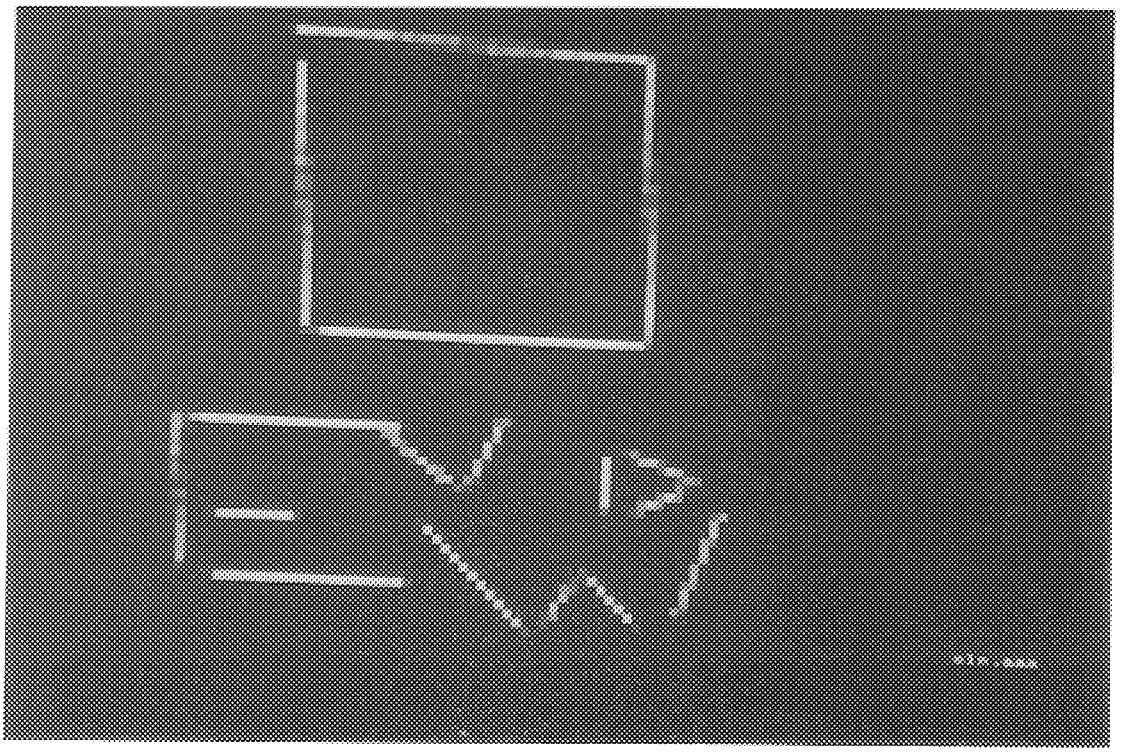
Figure 5D:
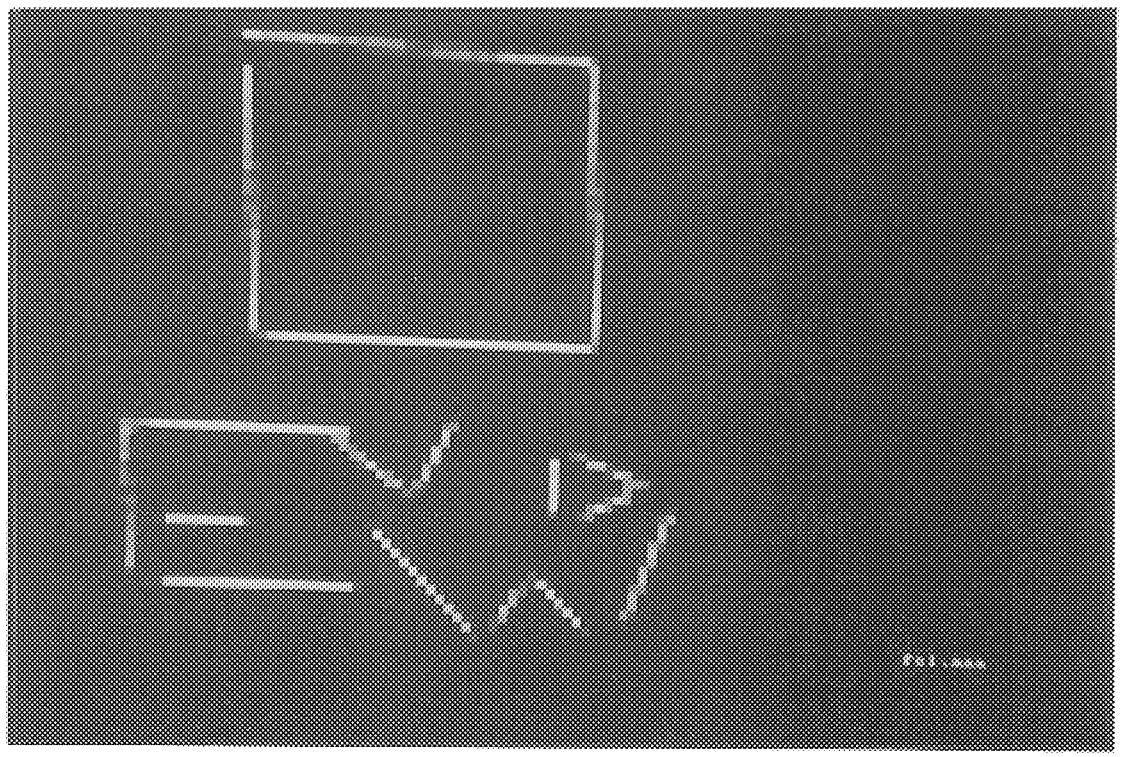

Once the subtractive phase is completed, the image is restored according to the reconstructive phase of the method of this invention. The reconstructive phase is illustrated in FIG. 4. Beginning at step 610, the process of image reconstruction begins. At step 620, a clean beam pointer is input at the middle of the clean beam (delta function array). The delta function array is then scanned from the location of the clean beam pointer through the array at step 630 until a position having a non-zero delta function (peak feature) is located. When a non-zero delta function is located, at step 640, an image pointer is set to the corresponding location in the clean beam. The intensity of that pixel is restored by multiplying the image in that array location with the clean beam (delta function) image in the corresponding array location. The multiplication is accomplished at step 650.

The next step, which is illustrated at step 660, is to restore the proper intensity for the pixels neighboring the current location. The current location in the image continues to be marked by the image pointer described above. This is achieved by overlaying the point spread function at the peak feature position.

For additional detail on the method, according to one preferred embodiment, of this invention, reference is made to the source code appendix.

FIG. 5(*a*) is a simple line picture of 100×100 pixels with a dynamic range of 64 grey scales. The line picture of FIG. 5(*a*), after being blurred by a two-dimensional Gaussian PSF is shown in FIG. 5(*b*). The image was then deconvolved using both CLEAN and FASTCLEAN. The same two-dimensional Gaussian PSF was used as the dirty beam and a delta function was used as a clean beam. The resulting line picture after deconvolution using CLEAN is shown in FIG. 5(*c*) while that using FASTCLEAN is shown in FIG. 5(*d*). In this example, the value of γ was chosen as 0.25. Additionally, T was selected to be 0.01, representing a threshold of 1% of the original data set's peak intensity. For FASTCLEAN, β was 0.1.

As can be seen in the figures, both resultant images closely resemble the original. Moreover, the FASTCLEAN and CLEAN images are virtually indistinguishable. Table 1 illustrates the primary advantage of the present invention: increased processing speed.

TABLE 1

Comparison of CLEAN and FASTCLEAN. The Ratio represents the ration of computational time spent in the subtractive phase of CLEAN divided by the respective time in FASTCLEAN.

| IMAGE SIZE | CLEAN ITERA-TIONS | CLEAN TIME | FASTCLEAN ITERATIONS | FAST-CLEAN TIME | RATIO |
|---|---|---|---|---|---|
| 1 × 250 | 1028 | 16 secs | 28 | 0.9 secs | 19 |
| 100 × 100 | 6507 | 224 secs | 40 | 9 secs | 25 |
| 240 × 250 | 292,444 | 40200 secs | 44 | 442 secs | 91 |

The values in Table 1 were obtained using a PC having a 486 type processor at 33 MHz processing speed. Each of the three image sizes, in pixels, represent increasing complexity for deconvolution, from a spectrum-like one dimensional image to a large sized two dimensional image. The second image (100×100) represents that shown in FIG. 5(*a*).

While the invention has been particularly described with reference to particular embodiments thereof, it will be understood by those skilled in the art that various other changes in detail may be made therein without departing from the spirit, scope or teachings of this invention.

Attorney Docket No. 16865-0133

SOURCE CODE APPENDIX

08/346253

```c
#include "clean.h"
include "screen.h"

int xres , yres;
unsigned long iterations = 0;
unsigned int peakvalue = 25500;
float gamma, threshold;
long max_imagesize = 64000;
char filter_width_dirty, filter_height_dirty;
char filter_width_clean, filter_height_clean;

short main(void)              /* START OF MAIN PROGRAM */
{
            /* Declaration of variables */
     struct dostime_t t1, t2;
     unsigned long time1, time2, etime;
     unsigned int huge *delta;
     unsigned int huge *image;
     unsigned int huge *image_int;
     unsigned int huge *dirty;
     unsigned int huge *clean;
     unsigned long counter;

/* allocate memory for the image, delta-functions and flters */
     if ((image = (unsigned int huge *) farcalloc((unsigned long)image_width * image_height,
sizeof(unsigned int))) = = NULL) exit(1);
     if ((delta = (unsigned int huge *) farcalloc((unsigned long)image_width * image_height,
sizeof(unsigned int))) = = NULL) exit(1);
     if ((clean = (unsigned int huge *) farcalloc((unsigned long)filter_width_clean_max *
filter_height_clean_max, sizeof(unsigned int))) = = NULL) exit(1);
     if ((dirty = (unsigned int huge *) farcalloc((unsigned long)filter_width_dirty_max *
filter_height_dirty_max, sizeof(unsigned int))) = = NULL) exit(1);

/* Read bitmap image */
     if (Read_bmp(image)){
            farfree(image);
            farfree(delta);
            farfree(clean);
            farfree(dirty);
            exit(1);
     }

/* Read the filters and the parameters from Stream's */
     if (Read_data(dirty, clean)){
            farfree(image);
            farfree(delta);
            farfree(clean);
            farfree(dirty);
            exit(1);
```

1

}
```
        /* install graphics screen */
Init_screen();

/* Draw the original image */
Draw_image_int(image);

sound(1000);
getch();
nosound();

_dos_gettime(&t1); /* Get start time */

/* Subtract the Dirty-beam and create Delta_functies */
Make_delta_functions(image, dirty, delta);

_dos_gettime(&t2); /* Get finish time */

/* Multipli Delta-function with the clean-beam */
farfree(image);

image = (unsigned int huge *) farcalloc(((unsigned)image_width * image_height), sizeof(unsigned int));

/* Rebuilt image from the delta-functions */
Rebuilt_image(image, clean, delta);

/* Reset the intensity's that are to bright */
Rescale_image(image);

/* close the graphic screen */
closegraph();

/* Save the new image */
Save_bmp(image);

/* Calculate the calculation time */
time1 = (3600 * t1.hour) + (60 * t1.minute) + (t1.second);
time2 = (3600 * t2.hour) + (60 * t2.minute) + (t2.second);
etime = time2 -time1;

/* Free the all memory */
farfree(image_int);
farfree(delta);
farfree(dirty);
farfree(clean);

/* print the number of iterations and the calculation time */
printf("\n\n\nThe number of iterations was %lu.\n\n", iterations);
printf("\n\nThe Calculationn time : %lu min. %lu sec.\n\n", etime/60, etime%60);
```

```
        return 0;
}                                       /* END OF PROGRAM */
/* This function draws a image on the screen */ include "clean.h"
include "screen.h"

void Draw_image_int(unsigned int huge *image_ptr)
{
        unsigned long func_counter;
        unsigned int xpos, ypos, grayvalue;

for (func_counter = 0; func_counter < ((long)yres * xres); func_counter++, image_ptr++){
                ypos    = func_counter / xres;  // row number current pixel
                xpos    = func_counter % xres;  // column number current pixel putpixel(xpos, ypos, (*image_ptr/100));
        }
}/* This function finds the highest intensity of a image */ include "clean.h"

unsigned long Gethighestint(unsigned short nmbofpixvert, unsigned short nmbofpixhorz, unsigned int huge *ptr_int)
{
        unsigned long  count;
        unsigned short highestpos = 0;
        unsigned int highest = 0;

for (count = 0; count < (unsigned long)(nmbofpixvert * nmbofpixhorz); count++){
                if (*ptr_int > highest){
                        highestpos = count;
                        highest = *ptr_int;
                }
                ptr_int++;
        }
        return highestpos;
}
                /*************************/
                /* install graphics screen */
                /*************************/ include "clean.h"
include "screen.h"

void Init_screen(void)
{
        unsigned short counter;
```

```
                /* request auto detection */
        int gdriver = DETECT, gmode, errorcode;

/* instal a extern screen driver */
        installuserdriver("Svga256", Detectmode);
        initgraph(&gdriver, &gmode, "");

/* read result of initialization */
        errorcode = graphresult();

/* an error occurred */
        if (errorcode != grOk){
                printf("Graphics error: %s\n", grapherrormsg(errorcode));
                printf("Press any key to halt:");
                getch();
                exit(1); /* terminate with an error code */
        }
                /* create gray scale */
        for (counter = 0; counter < 256; counter++)
                setrgbpalette(counter, counter/4, counter/4, counter/4);

}

/* This is the autodetect-function called by "installuserdriver" */
int huge Detectmode(void)
{
        return(SVGA640x480x256);
}/* This function subtract the dirty-beam from the dirty-image */ include "clean.h"
include <graphics.h> void Make_delta_functions(unsigned int huge *imageptr,
                                                unsigned int huge *filterptr,
                                                unsigned int huge *delta_ptr)

{
        unsigned int huge *copy_imageptr;
        unsigned int huge *copy_deltaptr;
        unsigned long offset_image;
        unsigned long offset_filter;
        char string[5];
        int maxx,maxy;

/* find the position of the highest intensity for the dirty-image */
        offset_image = Gethighestint(xres, yres, imageptr);

/* find middle point of the dirty-filter */
        offset_filter= ((unsigned)filter_width_dirty*filter_height_dirty/2);
```

```
                /* pointer to the highest intensity of dirty-beam */
        filterptr + = offset_filter;

/* while the highest value of the image is greater than
                /* the defined threshold subtract dirty-beam */
        while (*(imageptr + offset_image) > (threshold * peakvalue)){
                iterations++;
                        /* set pointer to highest intensity */
                copy_imageptr = imageptr + offset_image;
                        /* set delta pointer to the same offset position as the image */
                copy_deltaptr = delta_ptr + offset_image;
                        /* subtract the dirty-beam at current position */
                Subtract_dirty(copy_imageptr, copy_deltaptr, filterptr, offset_image);
                        /* find new highest intensity of the image */
                offset_image = Gethighestint(xres, yres, imageptr);
        }
}

/**************************/
/* subtract the dirty-beam */
/**************************/ void Subtract_dirty(unsigned int huge *image_ptr,
                                             unsigned int huge *deltapointer,
                                             unsigned int huge *filter_ptr,
                                             unsigned long image_offset)

{
        short counter1, counter2;
        short row_number, column_number;
        unsigned int image_peak;

/* store current highest intensity */
        image_peak = (*image_ptr);

/* save the amount of subtraction in the delta-function array */
        (*deltapointer)+ = (gamma * image_peak * (*filter_ptr)) /peakvalue;
                        /* subtract amount from the highest point */
        (*image_ptr)     -= (gamma * image_peak * (*filter_ptr)) /peakvalue;

/* calculate the row- and column number */
        row_number    = image_offset / xres;
        column_number = image_offset % xres;

for (counter1 = 1; counter1 <= (filter_width_dirty/2); counter1++){

/* if the position is not right from the image */
                if ((column_number + counter1) < xres)
                        if (*(image_ptr + counter1) > (gamma*(*(filter_ptr + counter1))*image_peak)
/peakvalue)
```

```
                                *(image_ptr + counter1) -=
                                          (gamma*(*(filter_ptr + counter1))*image_peak)
/peakvalue;
                  else
                                *(image_ptr + counter1) = 0;

/* if the position is not left from the image */
                  if ((column_number - counter1) >= 0)
                            if (*(image_ptr - counter1) >     (gamma*(*(filter_ptr - counter1))*image_peak)
/peakvalue)
                                *(image_ptr - counter1) -=
                                          (gamma*(*(filter_ptr - counter1))*image_peak) /peakvalue;
                  else
                                *(image_ptr - counter1) = 0;

/* if the position is not below the image */
                  if ((row_number + counter1) < yres)
                            if (*(image_ptr + (counter1 * xres)) > (gamma*(*(filter_ptr + (counter1 *
filter_width_dirty)))*image_peak) /peakvalue)
                                *(image_ptr + (counter1 * xres)) -=
                                          (gamma*(*(filter_ptr + (counter1 *
filter_width_dirty)))*image_peak) /peakvalue;
                  else
                                *(image_ptr + (counter1 * xres)) = 0;

/* if the position is not above the image */
                  if ((row_number - counter1) >= 0)
                            if (*(image_ptr - (counter1 * xres)) > (gamma*(*(filter_ptr - (counter1 *
filter_width_dirty)))*image_peak) /peakvalue)
                                *(image_ptr - (counter1 * xres)) -=
                                          (gamma*(*(filter_ptr - (counter1 *
filter_width_dirty)))*image_peak) /peakvalue;
                  else
                                *(image_ptr - (counter1 * xres)) = 0;

/* if the position is not right or below the image */
                  if (((row_number + counter1) < yres) && ((column_number + counter1) < xres))
                            if (*(image_ptr + (counter1 * xres) + counter1) > (gamma*(*(filter_ptr +
(counter1 * filter_width_dirty) + counter1))*image_peak) /peakvalue)
                                *(image_ptr + (counter1 * xres) + counter1) -=
                                          (gamma*(*(filter_ptr + (counter1 * filter_width_dirty) +
counter1))*image_peak) /peakvalue;
                  else
                                *(image_ptr + (counter1 * xres) + counter1) = 0;

/* if the position is not left or above the image */
                  if (((row_number - counter1) >= 0) && ((column_number - counter1) >= 0))
                            if (*(image_ptr - (counter1 * xres) - counter1) >     (gamma*(*(filter_ptr - (counter1
* filter_width_dirty) - counter1))*image_peak) /peakvalue)
                                *(image_ptr - (counter1 * xres) - counter1) -=
                                          (gamma*(*(filter_ptr - (counter1 * filter_width_dirty) -
```

```
counter1))*image_peak) /peakvalue;
                else
                        *(image_ptr - (counter1 * xres) - counter1) = 0;

/* if the position is not left or below the image */
                if (((row_number + counter1) < yres) && ((column_number - counter1) >= 0))
                        if (*(image_ptr + (counter1 * xres) - counter1) >         (gamma*(*(filter_ptr +
(counter1 * filter_width_dirty) - counter1))*image_peak) /peakvalue)
                                *(image_ptr + (counter1 * xres) - counter1) -=
                                        (gamma*(*(filter_ptr + (counter1 * filter_width_dirty) -
counter1))*image_peak) /peakvalue;
                        else
                                *(image_ptr + (counter1 * xres) - counter1) = 0;

/* if the position is not right or above the image */
                if (((row_number - counter1) >= 0) && ((column_number + counter1) < xres))
                        if (*(image_ptr - (counter1 * xres) + counter1) >         (gamma*(*(filter_ptr -
(counter1 * filter_width_dirty) + counter1))*image_peak) /peakvalue)
                                *(image_ptr - (counter1 * xres) + counter1) -=
                                        (gamma*(*(filter_ptr - (counter1 * filter_width_dirty) +
counter1))*image_peak) /peakvalue;
                        else
                                *(image_ptr - (counter1 * xres) + counter1) = 0;

for (counter2 = 1; counter2 < counter1; counter2++){

/* if the position is not right or below the image */
                        if (((row_number + counter1) < yres) && ((column_number + counter2) < xres))
                                if (*(image_ptr + (counter1 * xres) + counter2) >
(gamma*(*(filter_ptr + (counter1 * filter_width_dirty) + counter2))*image_peak) /peakvalue)
                                        *(image_ptr + (counter1 * xres) + counter2) -=
                                                (gamma*(*(filter_ptr + (counter1 * filter_width_dirty) +
counter2))*image_peak) /peakvalue;
                                else
                                        *(image_ptr + (counter1 * xres) + counter2) = 0;

/* if the position is not left or below the image */
                        if (((row_number + counter1) < yres) && ((column_number - counter2) >= 0))
                                if (*(image_ptr + (counter1 * xres) - counter2) >
(gamma*(*(filter_ptr + (counter1 * filter_width_dirty) - counter2))*image_peak) /peakvalue)
                                        *(image_ptr + (counter1 * xres) - counter2) -=
                                                (gamma*(*(filter_ptr + (counter1 * filter_width_dirty) -
counter2))*image_peak) /peakvalue;
                                else
                                        *(image_ptr + (counter1 * xres) - counter2) = 0;

/* if the position is not right or below the image */
                        if (((row_number + counter2) < yres) && ((column_number + counter1) < xres))
                                if (*(image_ptr + (counter2 * xres) + counter1) > (gamma*(*(filter_ptr +
(counter2 * filter_width_dirty) + counter1))*image_peak) /peakvalue)
                                        *(image_ptr + (counter2 * xres) + counter1) -=
```

```
                                                    (gamma*(*(filter_ptr + (counter2 * filter_width_dirty) +
counter1))*image_peak) /peakvalue;
                                        else
                                            *(image_ptr + (counter2 * xres) + counter1) = 0;

/* if the position is not right or above the image */
                    if (((row_number - counter2) > = 0) && ((column_number + counter1) < xres))
                            if (*(image_ptr - (counter2 * xres) + counter1) > (gamma*(*(filter_ptr -
(counter2 * filter_width_dirty) + counter1))*image_peak) /peakvalue)
                                        *(image_ptr - (counter2 * xres) + counter1) -=
                                                    (gamma*(*(filter_ptr - (counter2 * filter_width_dirty) +
counter1))*image_peak) /peakvalue;
                                        else
                                            *(image_ptr - (counter2 * xres) + counter1) = 0;

/* if the position is not left or below the image */
                    if (((row_number + counter2) < yres) && ((column_number - counter1) > = 0))
                            if (*(image_ptr + (counter2 * xres) - counter1) >
(gamma*(*(filter_ptr + (counter2 * filter_width_dirty) - counter1))*image_peak) /peakvalue)
                                        *(image_ptr + (counter2 * xres) - counter1) -=
                                                    (gamma*(*(filter_ptr + (counter2 * filter_width_dirty) -
counter1))*image_peak) /peakvalue;
                                        else
                                            *(image_ptr + (counter2 * xres) - counter1) = 0;

/* if the position is not left or above the image */
                    if (((row_number - counter2) > = 0) && ((column_number - counter1) > = 0))
                            if (*(image_ptr - (counter2 * xres) - counter1) > (gamma*(*(filter_ptr -
(counter2 * filter_width_dirty) - counter1))*image_peak) /peakvalue)
                                        *(image_ptr - (counter2 * xres) - counter1) -=
                                                    (gamma*(*(filter_ptr - (counter2 * filter_width_dirty) -
counter1))*image_peak) /peakvalue;
                                        else
                                            *(image_ptr - (counter2 * xres) - counter1) = 0;

/* if the position is not right or above the image */
                    if (((row_number - counter1) > = 0) && ((column_number + counter2) < xres))
                            if (*(image_ptr - (counter1 * xres) + counter2) >
(gamma*(*(filter_ptr - (counter1 * filter_width_dirty) + counter2))*image_peak) /peakvalue)
                                        *(image_ptr - (counter1 * xres) + counter2) -=
                                                    (gamma*(*(filter_ptr - (counter1 * filter_width_dirty) +
counter2))*image_peak) /peakvalue;
                                        else
                                            *(image_ptr - (counter1 * xres) + counter2) = 0;

/* if the position is not left or above the image */
                    if (((row_number - counter1) > = 0) && ((column_number - counter2) > = 0))
                            if(*(image_ptr - (counter1 * xres) - counter2) >(gamma*(*(filter_ptr -
(counter1 * filter_width_dirty) - counter2))*image_peak) /peakvalue)
                                        *(image_ptr - (counter1 * xres) - counter2) -=
                                                    (gamma*(*(filter_ptr - (counter1 * filter_width_dirty) -
```

```
                counter2))*image_peak) /peakvalue;
                                        else
                                                *(image_ptr - (counter1 * xres) - counter2) = 0;
                }
        }
}/* This function reads a bitmap file */ include "clean.h"

int Read_bmp(unsigned int huge *imageptr)
{
        FILE *original;
        long counterx, countery;
        unsigned int huge *copy_imageptr;
        int offset;
        char filename[50];

/* ask for the name of the image */
        printf("Give the name of the Dirty-image : ");
        scanf("%s", filename);

copy_imageptr = imageptr;
        if ((original = fopen(filename,"rb")) = = NULL){
                printf("Unable to open bitmap file!!\n");
                return(1);
        }

/* file-pointer to position to read x-resolutions */
        fseek(original, 18, 0);
        xres = fgetc(original)+ 256*fgetc(original);

/* file-pointer to position to read y-resolutions */
        fseek(original, 22, 0);
        yres = fgetc(original)+ 256*fgetc(original);

/* test if memory is sufficient */
        if (((long)xres*yres) > (max_imagesize)){
                clrscr();
                printf("Image to big !!!\n");
                return(1);
        }
                /* position file-pointer to lower byte of offset */
        fseek(original, 10, 0);
                /* read the offset for the image */
        offset = fgetc(original)+256*fgetc(original);

/* position to beginning of data */
        fseek(original, offset, 0);

/* read data and multipli by 100 */
```

```
        for (countery = yres; countery > 0; countery--){
                copy_imageptr = imageptr + (long)(countery-1)*xres;
                for (counterx = 0; counterx < xres; counterx++){
                        *copy_imageptr = (getc(original) *100);
                        copy_imageptr++;
                }

} fclose(original);

return(0);
}/* This function reads the data froma stream */ include "clean.h"

int Read_data(unsigned int huge *dirtyptr,
                                unsigned int huge *cleanptr)
{
        FILE *filter;
        FILE *filter1;
        FILE *para;
        unsigned long counter;

/*********************/
                /* read the dirty-beam */
                /*********************/ if ((filter = fopen("dirty.dat","rb")) == NULL){
                printf("Unable to open dirty.dat!!\n");
                return(1);
        }

/* read the size of the dirty-filter */
                /* (first to bytes in the file) */
        filter_width_dirty = fgetc(filter);
        filter_height_dirty= fgetc(filter);

for (counter = 0; counter < (unsigned)(filter_width_dirty * filter_height_dirty); counter++){
                *dirtyptr = 100 * (int)fgetc(filter);// fscanf(filter,"%c", dirtyptr);
                dirtyptr++;
        }
        fclose(filter);

/*********************/
                /* read the clean-beam */
                /*********************/
```

```
        if ((filter1 = fopen("clean.dat","rb")) == NULL){
                printf("Unable to open clean.dat !!\n");
                return(1);
        }

/* read the size of the clean-filter */
                /* (first to bytes in the file) */
        filter_width_clean = fgetc(filter1);
        filter_height_clean= fgetc(filter1);

for (counter = 0; counter < (unsigned)(filter_width_clean * filter_height_clean); counter++){
                *cleanptr = 100 * (int)getc(filter1);//fscanf(filter1,"%c", cleanptr);
                cleanptr++;
        }
        fclose(filter1);

/*********************/
                /* read the parameters */
                /*********************/ if ((para = fopen("para.dat","rb")) == NULL){
                printf("Unable to open para.dat !!\n");
                return(1);
        } fscanf(para, "%f ", &gamma); /* scan to skip the beta in the file */
        fscanf(para, "%f ", &gamma);
        fscanf(para, "%f", &threshold);

fclose(para);

return(0);
}/* This function rebuilt a image from the delta-functions */ include "clean.h"
include <graphics.h> void Rebuilt_image(unsigned int huge *image_ptr,
                                                unsigned int huge *filterptr,
                                                unsigned int huge *delta_ptr)
{
        unsigned long counter1, counter2;
        unsigned long counter_height, counter_width;
        unsigned int huge *copy_imageptr;
        unsigned long offset_filter;

/* pointer to middle of clean-beam */
        offset_filter = ((unsigned)filter_width_clean*filter_height_clean/2);
        filterptr += offset_filter;
```

```
                /* search delta-array for delta-functions */
                for (counter_height = 0; counter_height < yres; counter_height++){
                    for (counter_width = 0; counter_width < xres; counter_width++){

/* When delta-fuction is not zero rebuilt image at that location */
                        if (*delta_ptr > 0){

/* set pointer to location in the image */
                            copy_imageptr = image_ptr + (counter_height * xres) + counter_width;

/* restore intensity at current location */
                            *copy_imageptr + =
                                    (unsigned int)((unsigned long)(*delta_ptr)*(*filterptr) /
peakvalue);

/* restore intensitys for the neighbours of current location */
                            for (counter1 = 1; counter1 < (filter_width_clean/2); counter1++){

/* if the position is not right from the image */
                                if ((counter_width + counter1) < xres)
                                        *(copy_imageptr + counter1) + =
                                                (unsigned int)((unsigned
long)(*delta_ptr)*(*(filterptr + counter1)) / peakvalue);

/* if the position is not left from the image */
                                if (counter_width >= counter1)
                                        *(copy_imageptr - counter1) + =
                                                (unsigned int)((unsigned
long)(*delta_ptr)*(*(filterptr - counter1)) / peakvalue);

/* if the position is not below the image */
                                if ((counter_height + counter1) < yres)
                                        *(copy_imageptr + (counter1 * xres)) + =
                                                (unsigned int)((unsigned
long)(*delta_ptr)*(*(filterptr + counter1)) / peakvalue);

/* if the position is not above the image */
                                if (counter_height >= counter1)
                                        *(copy_imageptr - (counter1 * xres)) + =
                                                (unsigned int)((unsigned
long)(*delta_ptr)*(*(filterptr - counter1)) / peakvalue);

/* if the position is not right or below the image */
                                if (((counter_height + counter1) < yres) && ((counter_width +
counter1) < xres))
                                        *(copy_imageptr + (counter1 * xres) + counter1) + =
                                                (unsigned int)((unsigned
long)(*delta_ptr)*(*(filterptr + (counter1 * filter_width_clean) + counter1)) / peakvalue);

/* if the position is not right or above the image */
```

```c
                        if ((counter_height > = counter1) && ((counter_width +
counter1) < xres))
                                *(copy_imageptr - (counter1 * xres) + counter1) + =
                                        (unsigned int)((unsigned
long)(*delta_ptr)*(*(filterptr - (counter1 * filter_width_clean) + counter1)) / peakvalue);

/* if the position is not left or below the image */
                        if (((counter_height + counter1) < yres) && (counter_width > =
counter1))
                                *(copy_imageptr + (counter1 * xres) - counter1) + =
                                        (unsigned int)((unsigned
long)(*delta_ptr)*(*(filterptr + (counter1 * filter_width_clean) - counter1)) / peakvalue);

/* if the position is not left or above the image */
                        if ((counter_height > = counter1) && (counter_width > =
counter1))
                                *(copy_imageptr - (counter1 * xres) - counter1) + =
                                        (unsigned int)((unsigned
long)(*delta_ptr)*(*(filterptr - (counter1 * filter_width_clean) - counter1)) / peakvalue);

for (counter2 = 1; counter2 < counter1; counter2++){

/* if the position is not right or below the image
*/
                                if (((counter_height + counter2) < yres) &&
((counter_width + counter1) < xres))
                                        *(copy_imageptr + (counter2 * xres) + counter1)
+ =
                                                (unsigned int)((unsigned
long)(*delta_ptr)*(*(filterptr + (counter2 * filter_width_clean) + counter1)) / peakvalue);

/* if the position is not left or below the image */
                                if (((counter_height + counter2) < yres) &&
(counter_width > = counter1))
                                        *(copy_imageptr + (counter2 * xres) - counter1)
+ =
                                                (unsigned int)((unsigned
long)(*delta_ptr)*(*(filterptr + (counter2 * filter_width_clean) - counter1)) / peakvalue);

/* if the position is not right or below the image
*/
                                if (((counter_height + counter1) < yres) &&
((counter_width + counter2) < xres))
                                        *(copy_imageptr + (counter1 * xres) + counter2)
+ =
                                                (unsigned int)((unsigned
long)(*delta_ptr)*(*(filterptr + (counter1 * filter_width_clean) + counter2)) / peakvalue);

/* if the position is not left or below the image */
                                if (((counter_height + counter1) < yres) &&
(counter_width > = counter2))
```

```
                                        *(copy_imageptr + (counter1 * xres) - counter2)
+ =
                                                                  (unsigned int)((unsigned
long)(*delta_ptr)*(*(filterptr + (counter1 * filter_width_clean) - counter2)) / peakvalue);
                                        /* if the position is not right or above the image
*/
                            if ((counter_height > = counter2) && ((counter_width +
counter1) < xres))
                                        *(copy_imageptr - (counter2 * xres) + counter1)
+ =
                                                                  (unsigned int)((unsigned
long)(*delta_ptr)*(*(filterptr - (counter2 * filter_width_clean) + counter1)) / peakvalue);
                                        /* if the position is not left or above the image */
                            if ((counter_height > = counter2) && (counter_width > =
counter1))
                                        *(copy_imageptr - (counter2 * xres) - counter1)
+ =
                                                                  (unsigned int)((unsigned
long)(*delta_ptr)*(*(filterptr - (counter2 * filter_width_clean) - counter1)) / peakvalue);
                                        /* if the position is not right or above the image
*/
                            if ((counter_height > = counter1) && ((counter_width +
counter2) < xres))
                                        *(copy_imageptr - (counter1 * xres) + counter2)
+ =
                                                                  (unsigned int)((unsigned
long)(*delta_ptr)*(*(filterptr - (counter1 * filter_width_clean) + counter2)) / peakvalue);
                                        /* if the position is not left or above the image */
                            if ((counter_height > = counter1) && (counter_width > =
counter2))
                                        *(copy_imageptr - (counter1 * xres) - counter2)
+ =
                                                                  (unsigned int)((unsigned
long)(*delta_ptr)*(*(filterptr - (counter1 * filter_width_clean) - counter2)) / peakvalue);
                                    }
                                }
                            }
                            delta_ptr+ +;
                        }
            }
}/* This function rescales al the intensitys that are to high */ include "clean.h"

void Rescale_image(unsigned int huge *image){ long counter;
```

```c
        unsigned int highest;

for (counter = 0; counter < ((long)yres * xres); counter++, image++){
                if (*image >25500) *image = 25500;
        }
}
/* This function saves the result to disk */ include "clean.h"

int Save_bmp(unsigned int huge *imageptr)
{
        FILE *output;
        long counterx, countery;
        unsigned int huge *copy_imageptr;
        int offset;
        char filename[50];
        long filepos = 0;

/* ask for the name of the output-file */
        printf("Give the name for the Clean-image : ");
        scanf("%s", filename);

copy_imageptr = imageptr;
        if ((output = fopen(filename,"wb")) == NULL){
                printf("Unable to open bitmap file!!\n");
                return(1);
        }
                /* Write first two bytes of bitmap-file */
        fputc('B',output); filepos++;
        fputc('M',output); filepos++;

/* Write zero's until the position of the offset */
        for (;filepos < 10; filepos++)
                fputc(0, output);

/* Write the offset for were the data starts (offset = 1078) */
        fputc((1078%256), output); filepos++;
        fputc((1078/256), output); filepos++;

/* Write zero's until the position of the resolutions */
        for (;filepos < 18; filepos++)
                fputc(0, output);

/* Write the number of pixels in the x-direction */
        fputc(xres%256, output); filepos++;
        fputc(xres/256, output); filepos++;
```

```
            for (;filepos < 22; filepos++)
                    fputc(0, output);

/* Write the number of pixels in the y-direction */
    fputc(yres%256, output); filepos++;
    fputc(yres/256, output); filepos++;

for (;filepos < 28; filepos++)
                    fputc(8, output);

/* write data-format (number of bits per pixel) */
    fputc(8,output); filepos++;

/* write zero's until the start of the data */
    for (;filepos < 1078; filepos++)
            fputc(0, output);

/* Write the data to disk */
    for (countery = (yres-1); countery >= 0; countery--){
            copy_imageptr = imageptr + (unsigned long)countery*xres;
            for (counterx = 0; counterx < xres; counterx++){
                    fputc((*copy_imageptr/100), output);
                    copy_imageptr++;
            }
    }
    fclose(output);
    return(0);
}       /* This header-file holds all the main include's, define's */
        /* variables and functions used in the program.           */ include <stdio.h>
include <conio.h>
#include <stdlib.h>
#include <alloc.h>
include <dos.h> define filter_width_dirty_max   50
define filter_height_dirty_max  50
#define filter_width_clean_max   50
#define filter_height_clean_max  50
#define image_width              320    // max. image width
define image_height             200    // max. image height extern int xres, yres;                          // variables for the resolution
extern unsigned long iterations;                // variable for number of iterations
extern unsigned int peakvalue;                  // Highest possible intensity extern float gamma, threshold;
extern long max_imagesize;
```

```c
// variables for the height and the width of the filters
extern char filter_width_dirty, filter_height_dirty;
extern char filter_width_clean, filter_height_clean;

/*******************************/
/* Definition of the functions */
/*******************************/ unsigned long Gethighestint(unsigned short,
                                                    unsigned short,
                                                    unsigned int huge *);

void Make_delta_functions(unsigned int huge *,
                                                    unsigned int huge *,
                                                    unsigned int huge *);

void Subtract_dirty(unsigned int huge *,
                                    unsigned int huge *,
                                    unsigned int huge *,
                                    unsigned long);

void Rebuilt_image(unsigned int huge *,
                                    unsigned int huge *,
                                    unsigned int huge *);

void Rescale_image(unsigned int huge *);

void Make_subtractimage(unsigned int huge *,
                                            unsigned int huge *,
                                            unsigned int huge *,
                                            unsigned int huge *,
                                            unsigned int);

int Read_data(unsigned int huge *,
                            unsigned int huge *);

int Read_bmp(unsigned int huge *);

int Save_bmp(unsigned int huge *);        /* This header-file holds all the defines and functions */
        /* that are needed for the graphics part of the program */ include <graphics.h>

/* These are the currently supported modes */
#ifndef SVGA320x200x256
#define        SVGA320x200x256        0        /* 320x200x256 Standard VGA   */
#define        SVGA640x400x256        1        /* 640x400x256 Svga/VESA        */
#define        SVGA640x480x256        2        /* 640x480x256 Svga/VESA        */
```

```
#define     SVGA800x600x256      3     /* 800x600x256 Svga/VESA      */
#define     SVGA1024x768x256     4     /* 1024x768x256 Svga/VESA     */
#define     SVGA640x350x256      5     /* 640x350x256 Svga
*/
endif define graymax 63  /* maximum number of grayscales */

/*************************************************/
        /* Definition of the functions that use graphics */
        /*************************************************/ void Init_screen(void);

int huge Detectmode(void);

void Draw_image_int(unsigned int huge *);
```

What is claimed is:

1. An apparatus for deconvolving images, said image containing a plurality of peak features, each peak feature comprising a set of pixels having an intensity value within a predetermined range of the predetermined threshold intensity, said plurality of peak features being processed in parallel, said apparatus comprising:

means for digitizing each of said images into a digitized image comprising a plurality of pixels, each pixel having an intensity value;

selection and comparison means for selecting the pixel having the highest intensity value and determining it the highest intensity value has an intensity value above a predetermined threshold intensity;

first generating means, responsive to the selection and comparison means, for generating a subtract image array if said pixel with the highest intensity value has an intensity value above said predetermined threshold intensity, said first generating means is generating a subtract image array comprising a subtract value for each peak feature of said digitized image;

processing means, responsive to the comparing means, for fractionally subtracting the subtract image array from said digitized image to generate a modified digitized image;

control means for iteratively reinitiating the selection and comparison means and the processing means for subsequent iterations until the highest intensity level in the modified digitized image does not exceed the predetermined threshold;

second generating means for constructing a deconvolved digitized image from the modified digitized image; and display means for displaying said deconvolved digitized image.

2. The apparatus of claim 1 wherein said processing means includes a first memory for storing said digitized image.

3. The apparatus of claim 2 wherein said processing means further includes a second memory interfacing with said display means for storing said deconvolved image.

4. The apparatus of claim 1 wherein said processing means further generates a delta function array, the delta function array comprising the difference between the digitized image and the subtract image array, said processing means further utilizing the delta function array to constructing the deconvolved image.

5. The apparatus of claim 1 wherein said predetermined range comprises intensities from the intensity of the peak feature having the highest intensity, $I_{max}$, to an intensity $I_{max} * (1-\beta)$ where $\beta$ is in the range from 0.05 to 0.25.

6. The apparatus of claim 1 where said subtract image array is generated using a point spread function which is selected from a plurality of point spread functions through a process of blind deconvolution.

7. A method for deconvolving images, said images containing a plurality of peak features, each peak feature comprising a plurality of pixels having an intensity value within a predetermined range of the highest intensity value, said plurality of peak features being processed in parallel, said method comprising the steps of:

digitizing each of said images into a digitized image comprising a plurality of pixels, each pixel having an intensity value;

selecting the pixel having the highest intensity value;

determining if the highest intensity value exceeds a predetermined threshold;

generating a set of peak features if the highest intensity value exceeds the predetermined threshold;

using the set of peak features to generate a subtract image arrays the subtract image array comprising a subtract value for each peak feature in the set of peak features:

fractionally subtracting the subtract image array from said digitized image to generate a modified digitized image;

iteratively performing the selecting, comparing, using and fractionally subtracting steps until the highest intensity level of the modified digitized image does not exceed the predetermined threshold;

constructing a deconvolved digitized image from the modified digitized image; and reconstructing said digitized image from the deconvolved digitized image.

8. The method of claim 7 further comprising the step of displaying said reconstructed digitized image.

9. The method of claim 7 wherein said step of reconstructing said digitized image comprises multiplying said delta function array with said deconvolved digitized image.

10. The method of claim 7 wherein said step of reconstructing said digitized image further comprises the step of reconstructing image data surrounding said peak features.

11. The method of claim 7 wherein said fractional subtraction is accomplished according to the equation:

$$I(X)_{n+1} = I(X)_n - \sum_{o}^{k} (I_m/I_{max})\gamma P(X)\delta(x - x_m)$$

where the summation over m represents the number of peak features, k, in data set $I(x)_n$ with intensities between the peak feature, $I_{max}$ and intensity $I_{max} (1-\beta)$ where $\beta$ is a predetermined intensity range.

12. The method of claim 11 wherein $\beta$ is in the range from 0.05 to 0.25.

13. The method of claim 7 where said subtract image array is generated using a point spread function is selected from a plurality of point spread functions through the process of blind deconvolution.

14. A device for deconvolving images, said images containing a plurality of peak features, each peak feature comprising a pixel having an intensity value within a predetermined range of the highest intensity value, said plurality of peak features being processed in parallel, said device comprising:

means for digitizing each of said images into a digitized image comprising a plurality of pixels, each pixel having an intensity value;

selection and comparison means for selecting the pixel having the highest intensity value determining if the highest intensity value exceeds a predetermined threshold;

first generating means, responsive to the selection and comparison means, for generating a set of peak features if the highest intensity value exceeds the predetermined threshold, and using the set of peak features to generate a subtract image array, the subtract image array comprising a subtract value for each peak feature in the set of peak features;

means for fractionally subtracting the subtract image array from said digitized image to generate a modified digitized image;

control means for iteratively reinitiating the selection means, the comparing means, and the processing means for subsequent iterations until the highest intensity level of the modified digitized image does not exceed the predetermined threshold; and means for reconstructing said image from the modified digitized image.

15. The device of claim 14 further comprising means for displaying said reconstructed image.

16. The device of claim 14 wherein said means for reconstructing said digitized image comprises means for multiplying said delta function array with said modified digitized image.

17. The device of claim 16 wherein said means for reconstructing said digitized image further comprises means for reconstructing image data surrounding said peak features.

18. The device of claim 14 wherein said fractional subtraction is accomplished according to the equation:

$$I(X)_{n+1} = I(X)_n - \sum_{o}^{k} (I_m/I_{max})\gamma P(X)\delta(x - x_m)$$

where the summation over m represents the number of features, k, in data set $I(x)_n$ with intensities between the peak feature, $I_{max}$ and intensity $I_{max}(1-\beta)$ where $\beta$ is a predetermined intensity range.

* * * * *